(12) United States Patent
Booij et al.

(10) Patent No.: US 7,969,820 B2
(45) Date of Patent: Jun. 28, 2011

(54) MOBILE OBJECT COMMUNICATION AND POSITION DETERMINATION

(75) Inventors: Wilfred Edwin Booij, Nordby (NO); Jonas Tysso, Oslo (NO); Kristian Lund, Oslo (NO); Endre Bakka, Lillestrøm (NO)

(73) Assignee: Sonitor Technologies AS, Oslo (NO)

( * ) Notice: Subject to any disclaimer, the term of this patent is extended or adjusted under 35 U.S.C. 154(b) by 446 days.

(21) Appl. No.: 12/107,162

(22) Filed: Apr. 22, 2008

(65) Prior Publication Data

US 2008/0259732 A1 Oct. 23, 2008

Related U.S. Application Data

(60) Provisional application No. 60/913,347, filed on Apr. 23, 2007.

(30) Foreign Application Priority Data

Jul. 26, 2007 (GB) .................................. 0714577.4

(51) Int. Cl.
    *G01S 3/80* (2006.01)
(52) U.S. Cl. ..................................................... 367/127

(58) Field of Classification Search .................. 367/127, 367/6, 2
See application file for complete search history.

(56) References Cited

U.S. PATENT DOCUMENTS

| | | | | |
|---|---|---|---|---|
| 4,813,025 | A | * | 3/1989 | Rowland et al. ............... 367/127 |
| 5,185,725 | A | | 2/1993 | Kent et al. |
| 2003/0142587 | A1 | | 7/2003 | Zeitzew |
| 2005/0232081 | A1 | | 10/2005 | Holm |
| 2008/0151692 | A1 | * | 6/2008 | Dijk et al. ....................... 367/127 |
| 2008/0259732 | A1 | * | 10/2008 | Booij et al. ..................... 367/127 |

FOREIGN PATENT DOCUMENTS

| | | | | |
|---|---|---|---|---|
| WO | WO 2006/013512 | | 2/2006 | ......................... 15/74 |
| WO | WO 2008/129295 | * | 10/2008 | |

* cited by examiner

*Primary Examiner* — Dan Pihulic
(74) *Attorney, Agent, or Firm* — O'Shea Getz P.C.

(57) ABSTRACT

An ultrasound position determination system includes a base unit and at least one mobile unit. Each of the mobile and base units are operable to transmit and receive ultrasonic signals. The mobile unit is adapted to transmit a predetermined signal in dependence upon the state of transmission of the base unit. The base unit is adapted to determine the time taken for the signal to pass from the mobile unit to the base unit and thereby calculate a distance between the mobile unit and the base unit.

15 Claims, 7 Drawing Sheets

MOBILE OBJECT COMMUNICATION AND POSITION DETERMINATION

Applicant hereby claims priority benefits of U.S. Provisional Patent Application No. 60/913,347 filed Apr. 23, 2007 and Great Britain Patent Application No. 0714577.4 filed Jul. 26, 2007, the disclosures of which are herein incorporated by reference.

BACKGROUND OF THE INVENTION

This invention relates to communication between a static base and a mobile object and/or to the determination of the presence and/or position of a mobile object. It relates particularly, although not necessarily exclusively, to the use of ultrasound.

SUMMARY OF THE INVENTION

When viewed from one aspect, the invention provides an ultrasound position determination system comprising a base unit and at least one mobile unit. Each of the mobile and base units are operable to transmit and receive ultrasonic signals. The mobile unit is adapted to transmit a predetermined signal in dependence upon the state of transmission of the base unit. The base unit is adapted to determine the time taken for the signal to pass from the mobile unit to the base unit and thereby calculate a distance between the mobile unit and the base unit.

When viewed from a second aspect, the invention provides an ultrasound position determination system comprising a base unit and at least one mobile unit. The mobile unit is adapted to transmit an ultrasonic signal in response to a signal from the base unit. The base unit is adapted to determine the time taken for the ultrasonic signal to pass from the mobile unit to the base unit and thereby calculate a distance between the mobile unit and the base unit.

The Applicant has identified the desirability of a system in which a base unit is able to determine information about the position of one or more mobile units, particularly over a short range such as within a room in a building. There are many possible applications of such a system. One potential, non-limiting, example application envisaged by the Applicant is a system for determining the presence of any of a number of tags in a room in a house in which a television set is situated in order to be able automatically to log television audience data.

Preferably the system comprises a plurality of mobile units moveable independently of each other. Preferably each mobile unit has only one ultrasound transmitter.

In preferred embodiments of the invention the time taken for the ultrasonic signal to pass from the mobile unit is calculated from the aggregate time for the signal to be transmitted from the base unit to the mobile unit, and for the response to be received from the mobile unit. If the delay between reception of the signal at the base unit and transmission of its reply is known, the total time will be the sum of the propagation times of the signal and reply. Where the signals are of the same type, i.e. both ultrasound signals, the propagation times might be assumed to be the same and hence an average can be calculated. In another alternative, the request signal from the base unit to the mobile unit might be significantly faster than the reply, e.g. by using a signal from the electromagnetic spectrum, and therefore its propagation time might be negligible. However, there are also other possibilities. For example, it might be possible to take into account movement between the mobile unit and the base unit between reception of the request and transmission of the response.

In some embodiments of the invention, the mobile unit is configured to detect a break in transmission by the base unit and to transmit thereafter. This can be implemented in a manner similar to that for avoiding collisions between transmitters whereby a transmitter will not transmit if it detects that another transmitter is already transmitting. However, to be able to measure the distance between the base unit and the mobile unit in accordance with the invention, the time at which the mobile unit transmits its signal needs to be known; e.g., by making it a predetermined time after a cease of transmission by the base.

As mentioned above, a system in accordance with the invention could work with just one mobile unit or with a plurality of mobile units. When a system has a plurality of mobile units, each unit could be assigned a unique delay from the cessation of transmission by the base unit before transmitting its signal to the base unit. This is one way of ensuring that the mobile units do not transmit at the same time and avoids the need for each mobile unit to transmit identifying information. However, this is not essential.

In some embodiments the mobile unit is configured to detect a specific signal from the base unit; e.g., a particular frequency, change of frequency or sequence of transmissions. A single mobile unit or a plurality thereof could be used. Multiple mobile units could be configured to respond to the same specific signal from the base unit or could be configured to respond to different signals. If the mobile units respond to the same signal they are preferably configured to do so in different timeslots, but this is not essential. For example, the mobile units could instead respond in a non-predetermined sequence but include identification information; or one or more of the responses could include a spread spectrum signal such that collision avoidance is not necessarily required.

Preferably the mobile units in a system comprising multiple mobile units are able to distinguish between transmissions from the base and transmissions from other mobile units. One or any combination of, for example, duration of transmission, pattern of transmission, frequency, or codes could be used to provide such distinction.

The determination of position in accordance with the invention is not intended to imply any limitation as to accuracy. For example, the determination could be of coordinates in one, two or three dimensions, or could simply determine whether the mobile unit is in one or more zones. At the simplest level, the determination of position could simply determine whether the mobile unit was within a predetermined distance of the base unit or not.

When viewed from a third aspect, the invention provides an ultrasound position determination system comprising a base unit and at least one mobile unit. The mobile unit is adapted to transmit an ultrasonic signal in response to a signal from the base unit. The base unit is adapted to determine the time taken for the ultrasonic signal to pass from the mobile unit to the base unit and thereby determine whether the mobile unit is within a predetermined distance from the base unit.

As with the earlier aspects of the invention, it is preferred that the system comprises a plurality of mobile units moveable independently of each other. Preferably, each mobile unit has only one ultrasound transmitter.

When viewed from a fourth aspect, the invention provides a base unit configured to transmit a signal to a mobile unit comprising a transmitter configured to transmit a signal to one or more mobile units, and an ultrasound receiver configured to receive an ultrasonic signal from the or one of the mobile units. The base unit is adapted to determine the time taken for the ultrasonic signal to pass from the mobile unit to the base unit. Preferably, the base unit is configured to receive and process only ultrasonic signals from only one mobile unit at a time.

When viewed from a fifth aspect, the invention provides a mobile unit comprising a receiver configured to receive a request signal from a base unit and an ultrasonic transmitter configured to transmit an ultrasonic signal to the base unit after a predetermined time from receipt of the request signal.

The ultrasonic signal from the mobile unit could be used just to determine the distance of the mobile unit from the base unit. However, this is not essential. For example, the signal could include other information such as identification or status information. The status information could include movement status or history, or battery status. Indeed, any other information could be included in the signal, or such other information could additionally or alternatively be transmitted at other times.

The mobile unit is also referred to herein as a "tag". A "tag" is conveniently and preferably in the form of a self-contained device containing the ultrasound transmitter and receiver and associated processing. Preferably, the tag comprises its own power supply (e.g., a battery). However, none of these features is essential. For example, a tag could be an integral part of a larger object or device. It is to be understood therefore that the terms "tag" and "mobile unit" are interchangeable as used herein.

Ultrasound is normally understood to mean longitudinal pressure waves in any medium (e.g., air) having a frequency above the normal human hearing range. This is typically taken as being above 20 kHz, although in preferred embodiments of the invention frequencies between 30 and 50 kHz are used.

BRIEF DESCRIPTION OF THE DRAWINGS

Certain preferred embodiments of the invention will now be described, by way of example only, with reference to the accompanying drawings in which.

DETAILED DESCRIPTION OF THE INVENTION

Figure 1:
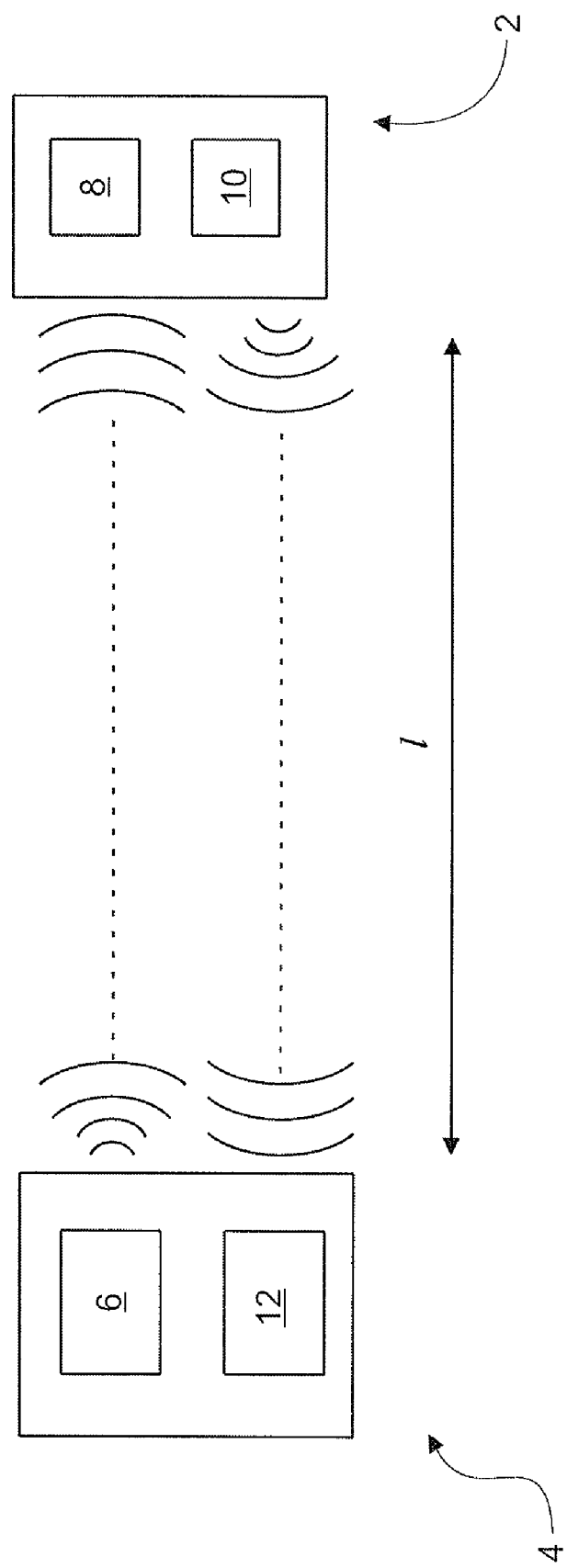
FIG. 1 is simplified schematic diagram of an object position detection system embodying with the invention.

FIG. 1 shows a simplified schematic diagram of an embodiment of the invention. This embodiment allows the separation of a mobile tag 2 from a base station 4 to be determined. Although only one tag 2 is shown for simplicity, a system in accordance with the invention will typically include a number of tags 2 which are moveable completely independently of each other.

First, the base unit transmitter 6 transmits a predetermined ultrasound pattern. As will be described later, there are many possible patterns could be employed but for this simple system with only one tag 2, a simple break in a continuous transmission can be used for example.

When the tag's receiver 8 receive the signal (or instead stops receiving it) the control electronics in the tag 2 will generate a reply signal via the tag's transmitter 10. This reply signal is then received by the receiver 12 of the base unit 4. The base unit 4 is thus able to measure the time taken for the signal it transmitted to be received and processed by the tag 2 and for the reply to be received.

The base unit can then determine the distance between the base station and the tag as provided below. The speed of sound "v" in air is given by the following equation:

$$v \approx (331.4 + 0.6 T_c) \text{m/s} \quad \text{Equation 1}$$

where $T_C$ is the temperature in Celsius. The speed "v" can also be expressed by the following equation:

$$v = \frac{l}{t_1 - t_0} \quad \text{Equation 2}$$

where l is the distance (range) in meters traveled by a signal between the two points in time $t_0$ and $t_1$. The distance l can be derived using Equation 1 and Equation 2:

$$l = (t_1 - t_0)v = (t_1 - t_0)(331.4 + 0.6 T_c) \quad \text{Equation 3}$$

The separation of the ultrasound tag 2 and the base station 4 can now be found by measuring the time of flight (TOF) between the base and the arrival of a tag's response at the detector; i.e., by measuring the time $t_1$ in Equation 3 above. In the simplest case it can be assumed that the distance l between them is twice the distance measured since the signal must travel to the tag 2 and the response travel back to the base 4. Compensation must be made for the processing delay at the tag 2 between detection of the signal and transmission of the response, e.g. by measuring the TOF when the tag is at a known distance from the base.

This simplistic illustration demonstrates the principle on which other embodiments of the invention are based. On each of the tag 2 and the base 4 the transmitter and receiver are shown as separate form one another merely for the purposes of illustration—the transmitter and receiver could indeed be separate, but they could alternatively employ the same transducer.

Figure 2:
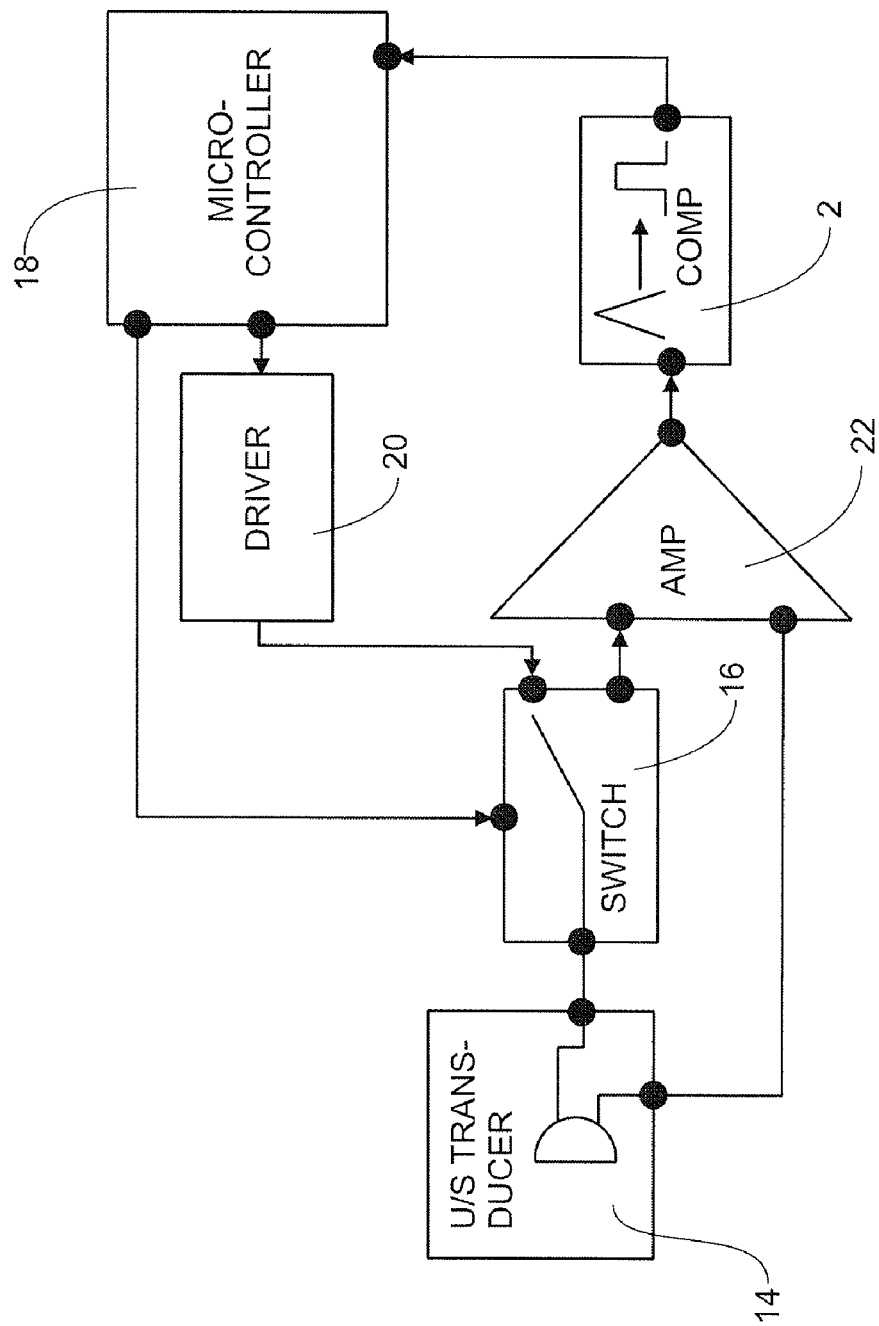
FIG. 2 is schematic diagram of the components of a mobile unit for use with the embodiments of the invention.

An exemplary receiver circuit for the tag 2 will now be outlined with reference to FIG. 2. The circuit comprises an ultrasound transducer 14 which can be operated in both transmit and receive modes. A switch 16 is used to switch the transducer between these two modes. The switch 16 is controlled by a micro-controller 18. When in transmit mode the micro-controller 18 sends a signal to a driver 20 for the transducer to cause it to drive the transducer 14 to produce a signal. When the switch is in receive mode, the output from the transducer is fed to an amplifier 22 which then feeds the signal to a comparator 24 to convert it into a binary 1 or 0. This is then fed back to the microcontroller 18.

In a simple embodiment, the tag 2 is arranged to transmit a response signal when it detects a gap in transmission from the base; i.e. it waits for the channel to become free. This is similar to functionality proposed for ultrasound tags to prevent conflicting transmissions between multiple tags, but is here employed for a different purpose.

In such use, the tag will generally stand-by in receive mode monitoring transmissions it receives. As long as the transducer 14 picks up a signal on the appropriate frequency (e.g., from the base), the tag 2 remains in receive mode. However as if a break in transmission is detected, the micro-controller 18 sends a signal to the switch 16 to switch to transmit mode and another to the driver 20 to generate a reply signal to be transmitted by the transducer 14. The micro-controller may be programmed to initiate the response signal as soon as a break in transmission is detected (albeit with a small inherent delay being inevitable) or after a predetermined deliberate delay.

Figure 3:
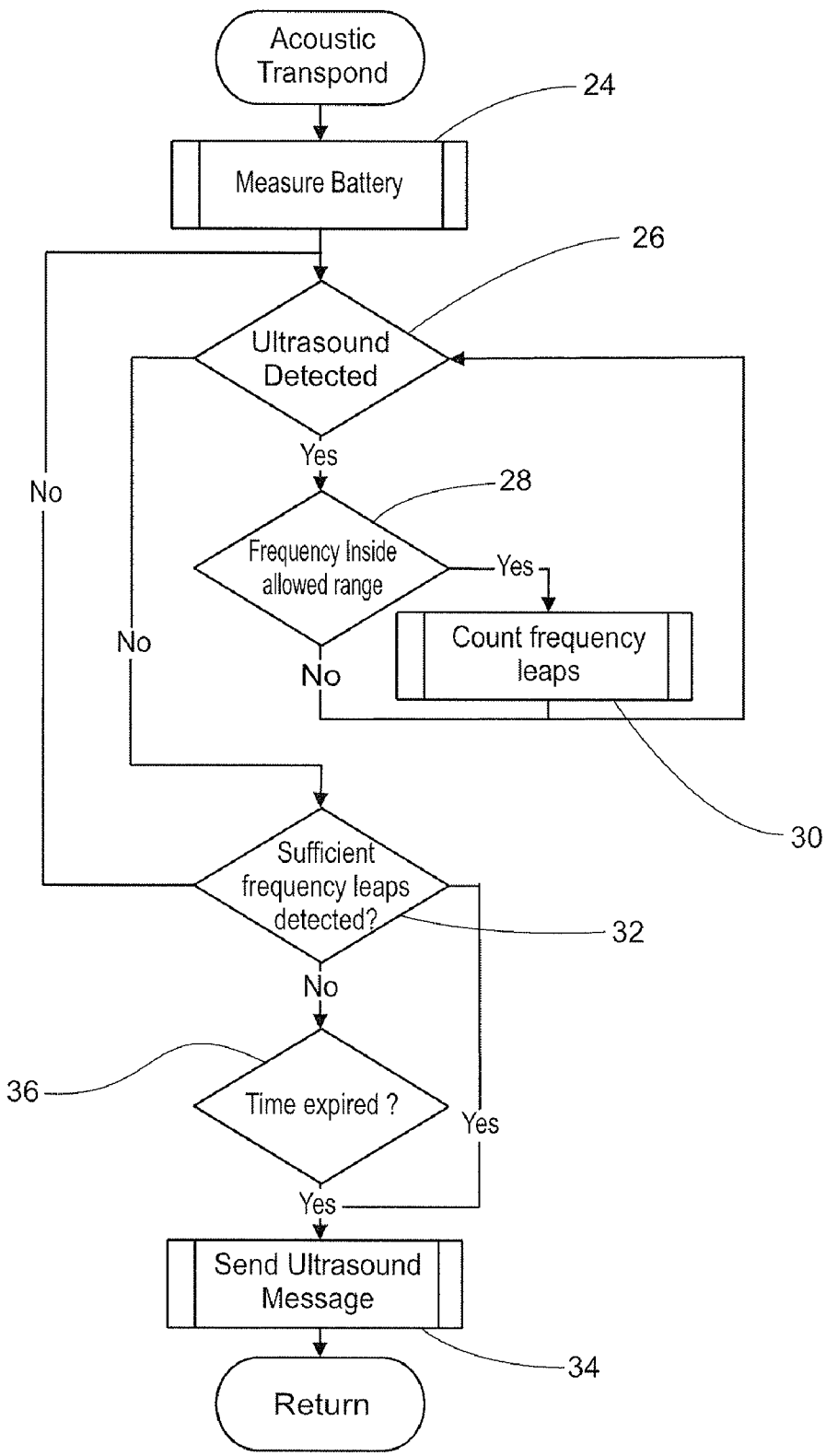
FIG. 3 is a simple flow diagram describing part of the operation of the mobile unit.

Another possibility would be to await a specific signal from the base. An exemplary flowchart of such a routine is shown in FIG. 3 and is described below.

The tag 2 starts its main loop by measuring its battery level at 24 so that this can be reported to the base station in the tag's message. Thereafter, a second loop is entered whereby the tag 2 starts listening for ultrasound at 26. If ultrasound is detected then a comparison is carried out at 28 to determine whether it is within a predefined frequency interval. If so, then at 30 the number of frequency leaps is counted.

When the tag detects a break in transmission (i.e. the ultrasound is no longer detected), it determines at 32 whether a sufficient number of frequency leaps has been detected to indicate a base request signal. If a sufficient number have been detected a response will be sent at 34. This message, or the timing of its transmission, will identify the tag and also contain information regarding the battery status determined at step 24.

If an insufficient number of frequency leaps to indicate a base request have been detected then the tag 2 returns to step 26 to standby listening for ultrasound.

Even if a base request message is not detected, if a threshold time has passed since the last message was sent (box 36), a message 34 will be sent anyway.

The ultrasound message in either type of system could contain information about battery status, whether a valid request has been detected (i.e. whether it is a 'timeout' message or not), and also whether the tag is in motion or not.

In accordance with the first mode of operation set out above, the base transmits ultrasound signals uninterrupted for a predetermined period, forcing tags to wait in standby without transmitting. The base then stops transmitting for a moment to enable the tag(s) to transmit an ultrasound message which is received by the base. The base can then start transmitting again after the message is received from the tag(s).

Figure 4:
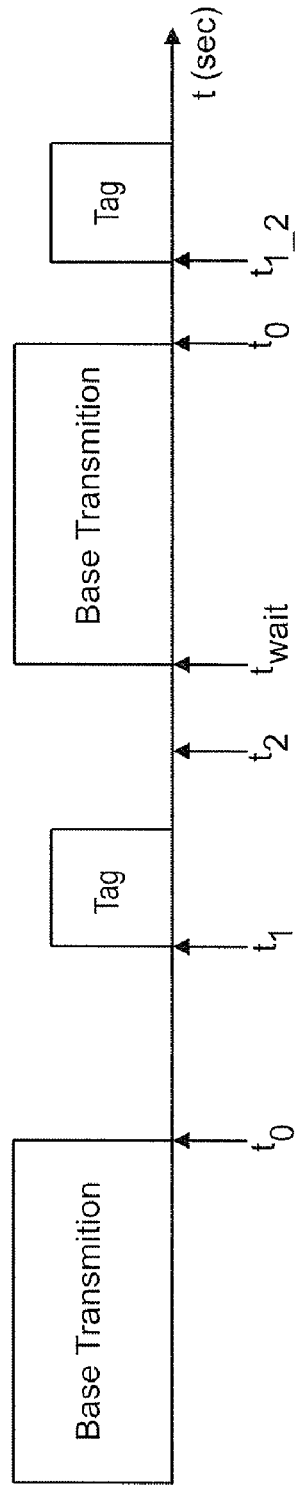
FIG. 4 is a timing diagram illustrating the operation of a system embodying the invention.

A simple illustration of this scheme with one tag is shown in FIG. 4. The base transmits ultrasound noise (uninterrupted repeated messages) until time $t_0$. At this time, the "line" becomes free and once this is sensed by the tag it will start to transmit an ultrasound message response at time $t_1$. The message is received at the base at time $t_2$. The base then recommences transmission, after a short delay, at time $t_{wait}$. The described arrangement therefore allows simple periodic polling of a mobile ultrasound transmitter tag. This allows the base to calculate the time of flight from the difference $t_2-t_1$ taking into account the tag's (previously determined) transmission delay. From this the distance of the tag from the base can be calculated. This can be used in many varied applications. For example, it could be used as a simple proximity detector to initiate an action such as switching on a light or opening a door when a tag is within a predetermined range.

Figure 5:
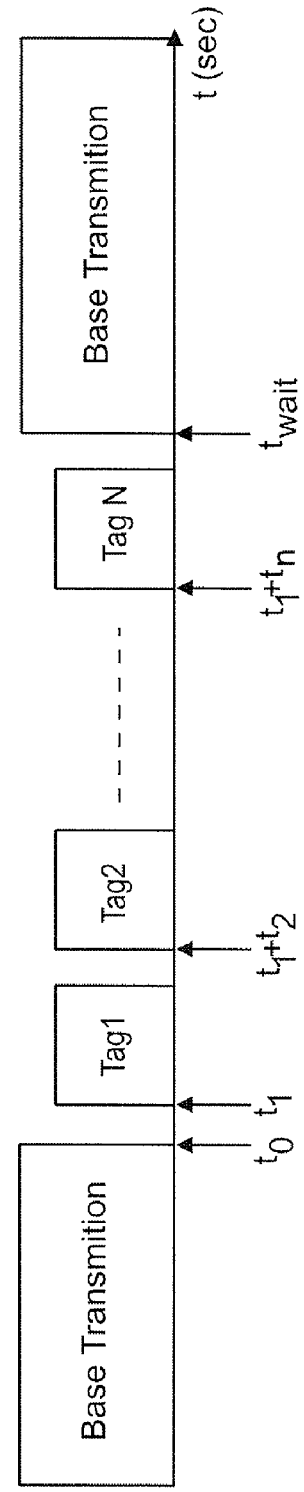
FIGS. 5 to 8 are timing diagrams for various alternative embodiments.

An exemplary extension of the scheme described above with reference to FIG. 4 can be adapted to accommodate multiple tags by programming each tag to wait a different preset period $t_x$ before it responds. This is shown in FIG. 5. Thus, after the base halts transmission at time to, the first tag transmits a message at time $t_1$. The second tag transmits its message at time $t_1+t_2$. As can be seen the delay in transmission $t_2$ between the first and second tags is greater than the time for the first tag transmits in order to avoid collision. FIG. 5 shows the base resuming transmission after each tag has responded once but this is not essential. For example, the sequence could be repeated any number of times or even continuously after each base transmission break. The base might be able to resume transmitting during the sequence to interrupt it and start again.

An alternative approach to simply waiting for a gap in transmission is for the tag to identify a specific base request message; e.g., using the tag receiver routine described above with reference to FIG. 3. The base request message can, for example, be a long message (e.g. multiple messages sent non-stop). By incorporating a counter that increments each time a valid frequency is sensed, (see step 30 in FIG. 3), the tag can then be capable of distinguishing a base request from a standard ultrasound message which would correspond to a lower count than the base request.

Figure 6:
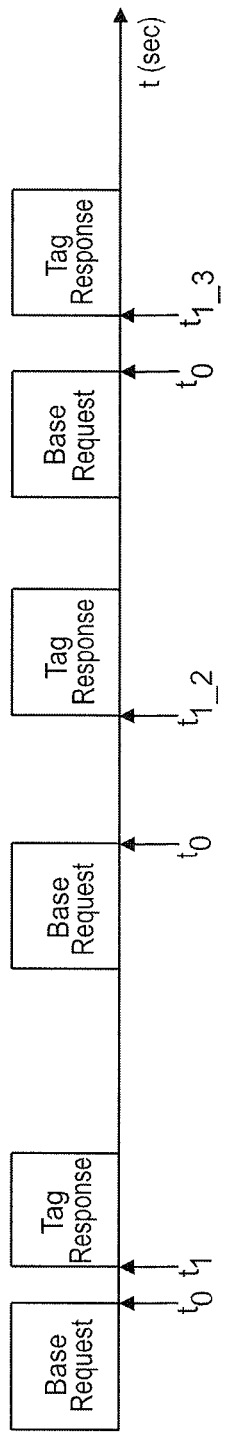

Alternatively, a tag may be able to calculate an estimate of the frequency of an ultrasound signal it receives. In other words, a request can be generating by sending a message using only one (or more) frequencies. The tag will only respond to a message with a given frequency (within a given frequency range). An example using a single tag is shown in FIG. 6.

Figure 7:
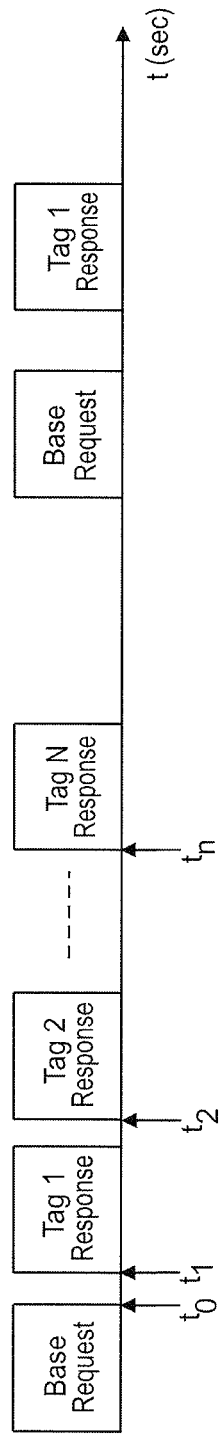

FIG. 7 shows one way of accommodating multiple tags. Each tag is programmed to wait a given period $t_x$ before it responds to a base request, as shown. This is therefore similar to the scheme described with reference to FIG. 5.

Figure 8:
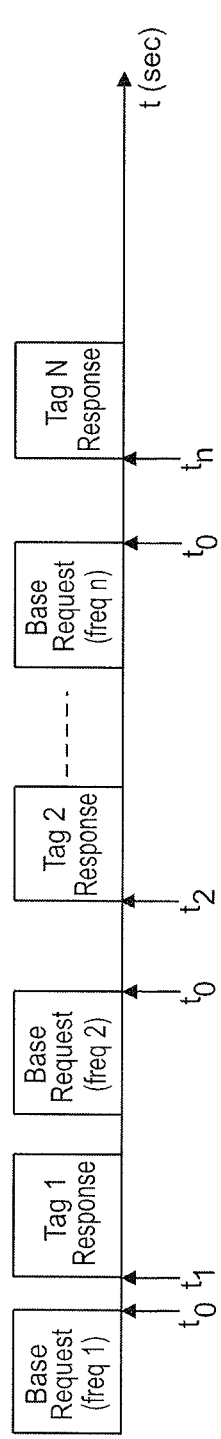

Another way of accommodating multiple tags comprises assigning different frequencies to different tags. This way, the base can send different messages requesting responses from individual tags, one at a time. This is illustrated in FIG. 8. The advantage of using this latter method is that periodical waiting is omitted. This waiting can cause timing inaccuracies as the tags' operating frequencies may vary slightly.

For all modes of operation in the preferred embodiments described above the tag begins to transmit as soon as possible after the condition prompting it to transmit has been met. This contrasts with the operation of known tags, as these typically wait a random time before sending to avoid cross-talk. In accordance with the preferred embodiments of the present invention, a random wait is unnecessary as the tags have separate, permitted transmission slots or different request signals.

A particularly easy and cost-effective way to provide an ultrasound transducer for the base station is to use an ordinary tag attached to the base which can be configured to communicate with the base (e.g., over a wired connection). The base can prompt the transmission of an ultrasound message request simply by sending an appropriate signal to the tag's micro-controller. This way, the base knows at what time an ultrasound message request has been sent. When a response arrives, the TOF is given directly by the time difference between the request and reply. The base preferably uses flank detection in order to obtain an accurate time measurement of the arrival of the tag response.

Another method comprises letting the base listen for a tag request. This way, no physical connection between the base and its tag is necessary. This can be done by letting the base tag send a standard ultrasound message (with a known ID) prior to a request. Taking the time between the arrival of the base tag message and the received response gives the TOF if the distance between the base detector and its transmitter tag is known. This latter method is possibly subject to more inaccuracy since two ultrasound message detections must be done.

A similar approach with greater accuracy is obtained by connecting the transducer of the base tag directly to one of the base channels.

An exemplary protocol for the communications between the base and the tags is a 12-bit protocol with 7-bit ID, 2-bit status (movement and battery), and 3 bit cyclic redundancy check (CRC) is suggested for use in the acoustic transponder system. The detector preferably uses flank detection in order to get an accurate time-stamp of the arrived tag response. Flank detection requires that the first bit is set to 0, thus restricting the ID-range to 1-31.

A 12 bit protocol is not essential. For example, in other implementations a 28 bit protocol is used. This is also purely exemplary. Any other protocol could be used instead as appropriate.

As previously mentioned the tags may be provided with a "time-out" mode when no base request is detected within a given time. The tag can then send a message even though no request is detected. For example the tag might use a different identification value when sending such a message.

In an experimental arrangement comprising tags constructed in accordance with the invention, the tag receiver circuit sensitivity was tested sending ultrasound at different frequencies. Preliminary tests were performed by reading out the detected frequency directly from the microcontroller. An LED was also used to indicate the frequency range of the detected signal, dividing the range into three intervals, each interval corresponding to one of three possible colors. It was observed that the listening circuitry was capable of distinguishing ultrasound frequency up to at least 12 meters.

Tags were programmed with the 'Wait for Request' routine set out in FIG. 3. This routine counts the number of valid frequency leaps (within restricted frequencies), and is run as long as the number of valid frequency leaps detected are below a certain threshold. This way, a request signal can be generated by the base-tag by sending a number of frequencies until the tag has recorded enough leaps to reply. In a multiple tag system, each tag can listen for leaps within a certain frequency band. This way different request signals can be generated. The tests used four different frequency pairs with two different lengths. This way, eight different requests can be generated.

A second method consists of letting the tag listen for a certain frequency and record the length of the signal on this frequency. Using eight frequencies, each tag can listen for a unique frequency in an eight tag system. This method was found in the tests to be more sensitive than the frequency leap detection method, but suffered from echo effects.

During tests it was found that tags were fully capable of distinguishing ultrasound frequencies from each other using either technique. A combination of the two methods can also be used.

Figure 9:
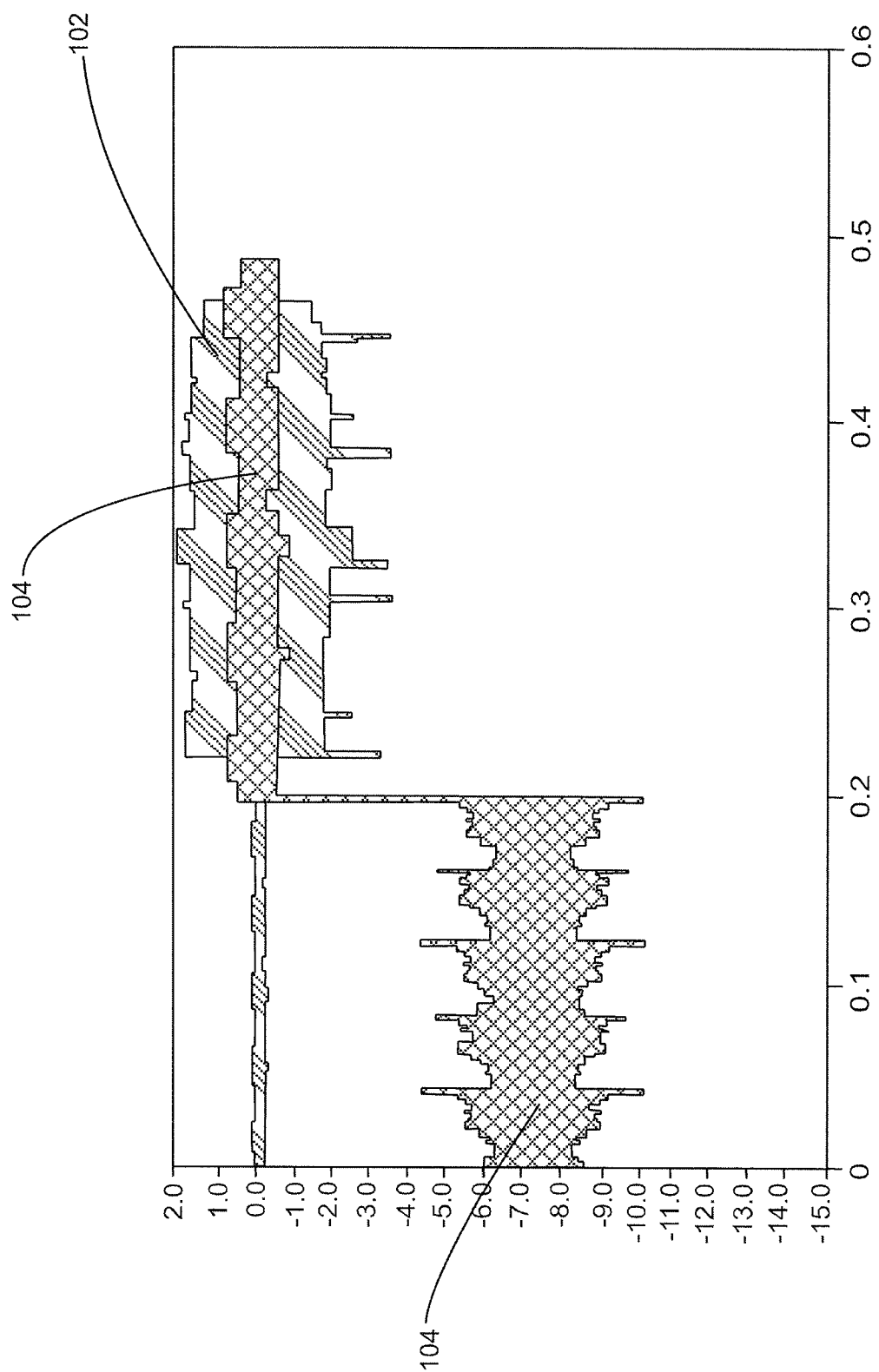
FIG. 9 is a plot of base tag current vs. sound pressure from a responding tag in a test system.

A test was also performed to check the timing, and to determine the inherent delay in transmission at the tag caused by the listening routine. This was done using the Texas Instruments DaqPad tool with LabView. Signals were captured by triggering on the base-tag current and measuring the sound pressure using a microphone placed next to the responding tag. In FIG. 9, the base tag current 102 vs. sound pressure 104 from the responding tag is shown.

Figure 10:
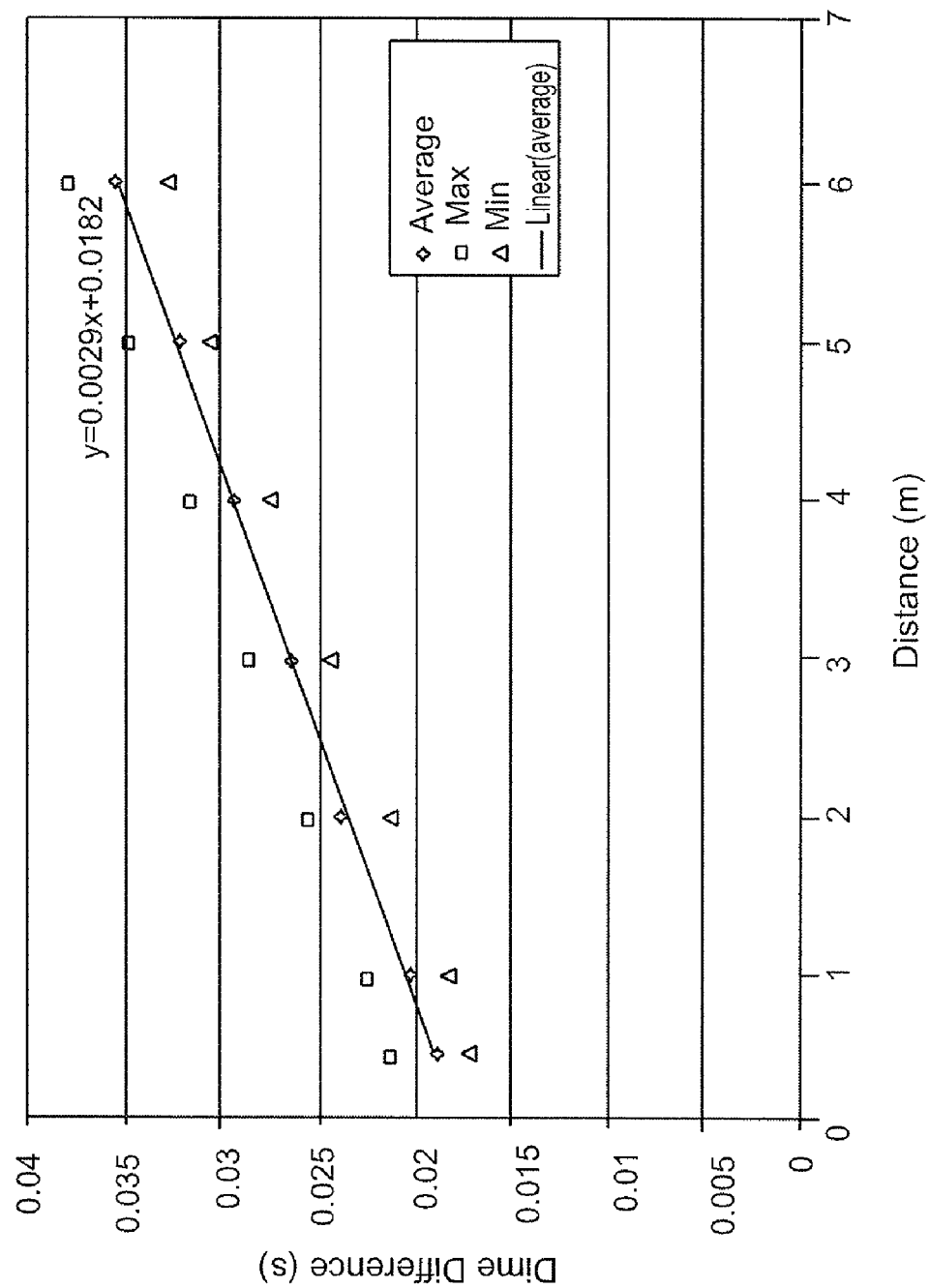
FIG. 10 is graph of distance between transmitter and receiver vs. time difference between transmission and receipt achieved in an experiment to determine the tag's time delay.

The test was performed for different distances (0.5 m-6 m) the responding tag pointing directly towards the requesting tag, in order to determine the constant offset. As shown in FIG. 10, this offset is calculated using linear regression. Using this value ($t_0$=18.2 ms) in Equation 3 the distance can be estimated.

The above test shows that it is possible to estimate the distance using TOF measurements.

Although the invention has been described and illustrated with respect to exemplary embodiments thereof, the foregoing and various other additions and omissions may be made therein and thereto without departing from the spirit and scope of the present invention.

What is claimed is:

1. An ultrasound position determination system comprising:
   a base unit; and
   at least one mobile unit;
   each of said mobile and base units operable to transmit and receive ultrasonic signals, said mobile unit being adapted to detect a break in transmission by the base unit and thereafter to transmit a predetermined signal, said base unit being adapted to determine the time taken for said signal to pass from the mobile unit to the base unit and thereby calculate a distance between the mobile unit and the base unit.

2. The system of claim 1, wherein the system has a plurality of mobile units, each mobile unit being assigned a unique delay from the break in transmission by the base unit before transmitting its signal to the base unit.

3. The system of claim 1, wherein the mobile unit is configured to transmit as soon as possible after detecting a break in transmission.

4. The system of claim 1, further comprising multiple mobile units wherein the mobile units are able to distinguish between transmissions from the base and transmissions from other mobile units.

5. The system of claim 1, further comprising a plurality of mobile units moveable independently of each other.

6. The system of claim 1, wherein the mobile unit has only one ultrasound transmitter.

7. An ultrasound position determination system comprising:
   a base unit; and
   at least one mobile unit;
   said mobile unit being adapted to detect a break in transmission by the base unit and thereafter to transmit an ultrasonic signal, said base unit being adapted to determine the time taken for said ultrasonic signal to pass from the mobile unit to the base unit and thereby calculate a distance between the mobile unit and the base unit.

8. The system of claim 7, wherein the system has a plurality of mobile units, each mobile unit being assigned a unique delay from the break in transmission by the base unit before transmitting its signal to the base unit.

9. The system of claim 7, wherein the mobile unit is configured to transmit as soon as possible after detecting a break in transmission.

10. The system of claim 7, further comprising multiple mobile units wherein the mobile units are able to distinguish between transmissions from the base and transmissions from other mobile units.

11. The system of claim 7, further comprising a plurality of mobile units moveable independently of each other.

12. The system of claim 7, wherein the mobile unit has only one ultrasound transmitter.

13. The system of claim 1 wherein the base unit is further adapted to determine, from the time taken for said signal to pass from the mobile unit to the base unit, whether the mobile unit is within a predetermined distance from the base unit.

14. A mobile unit operable to transmit and receive ultrasonic signals, said mobile unit being adapted to detect a break in transmission by a base unit and thereafter to transmit a predetermined signal.

15. The mobile unit of claim 14, further configured to transmit the predetermined signal to the base unit at a predetermined time after detecting the break in transmission by the base unit.

* * * * *